WILHELM F. M. HENDRIKS &
PETRUS H. VAN DEURSEN,
Inventors

WILHELM F. M. HENDRIKS &
PETRUS H. VAN DEURSEN,
Inventors

United States Patent Office 3,557,640
Patented Jan. 26, 1971

3,557,640
MEANS CONTROLLING THE DRIVING RATIO OF A MOTOR VEHICLE
Wilhelm F. M. Hendriks, Nuenen, and Petrus H. van Deursen, Deurne, Netherlands, assignors to Van Doorne's Automobielfabriken, N.V., Eindhoven, Netherlands
Filed Nov. 26, 1968, Ser. No. 779,029
Claims priority, application Netherlands, Dec. 8, 1967, 6716741
Int. Cl. B60k; F02d; G05g
U.S. Cl. 74—846   10 Claims

ABSTRACT OF THE DISCLOSURE

A motor vehicle having an internal combustion engine with a carburetor, a throttle control valve and a transmission system. The transmission system has one or more variable diameter belt driven pulleys, each having a belt of trapezoidal cross-section associated therewith. Each pulley has an axially displaceable half pulley and a cylinder controlling the variable half pulley has two chambers. A piston fixedly secured to the pulley shaft separates the chambers and a throw-over valve is associated with the piston controlling the pressure below atmospheric in the chambers created by the intake manifold of the engine. The throw-over valve has two selectively operable valve portions for serving the respective chambers of the variable pulley control cylinder and electrical means control the portions in dependence on the driving circumstances of the motor vehicle.

In one preferred embodiment, the two valve portions, which are solenoid operated, are respectively actuated by predetermined positions of the pivotal throttle valve within the intake manifold adjacent the carburetor, which valve actuates an attached micro-switch, and the other by a brake-operated switch. In other embodiments, centrifugal switches may be included in the respective electrical circuitry by being interposed between the solenoids of each valve portion of the throw-over valve and their respective aforesaid actuating devices. These latter centrifugal switches are operated also in accordance with predetermined vehicle conditions, i.e. the first as by the speed of the vehicle via its speedometer cable or shaft, and the other responsive to predetermined engine speed, with each being normally in the open condition below certain predetermined r.p.m.'s, and respectively the former serving to improve the shift quality, and the latter a cleaner exhaust emission.

---

The invention relates to a motor vehicle provided with an internal combustion engine having a carburetor, a throttle control valve and a transmission system comprising one or more expandable or variable diameter belt driven pulleys and an associated belt of trapezoidal cross section such as a V-belt, with at least one of the pulleys having an axially displaceable half pulley which is under the control of a cylinder having two chambers separated by a piston or a diaphragm fixedly secured to the pulley shaft. Operatively connected with the cylinder is a throw-over valve for controlling the pressure below atmospheric in said chambers created by the induction pipe of the engine.

In the embodiment mentioned above the angular rotation of the throttle valve of the carburetor necessary for a speed under 20 km./h., is smaller as the ratio of engine output/vehicle weight increases. Because of this fact an accurate adjustment of the moment of changing the transmission ratio is increasingly difficult. This means that when the engine output in a motor vehicle is increased, the mechanical control system cannot be applied anymore with success. Additionally a great number of vacuum pipes is necessary. An object of the invention is to remove said disadvantages.

A further object is to provide the throw-over valve of the motor vehicle in two portions for actuating the respective chambers of the cylinder, said portions being electrically controlled in dependence on the variable circumstances which occur while driving.

In a preferred embodiment of the motor vehicle according to the invention one portion of the two-portioned throw-over valve is controlled by the position of the throttle valve and the other portion electrically by the brake means of the vehicle.

A further object of the invention is to locate a centrifugal switching means in the circuit served by the throttle valve, said centrifugal switching means operating by the influence of the speed of the motor vehicle, in such a way that at predetermined speeds of the vehicle said circuit is interrupted or closed. Hereby it is possible to make the moment of changing the transmission ratio exclusively dependent on the vehicle speed.

According to the invention, in the electrical circuit controlled by the position of the braking means, also a centrifugal switching means can be placed, said centrifugal switching means operating under the influence of the number of revolutions of the engine in such a way that at a predetermined number of revolutions said circuit is interrupted.

If said number of revolutions e.g. is 1200/min. then at idling speed of the engine no false air can be drawn from the vacuum chambers of the belt pulleys. This means that the gaseous mixture for idling can be poor and that the exhaust gases contain little CO. If this is not the case then the mixture must be richer for idling in order to obviate stalling of the engine by the suction of air from the chambers of the pulley. A richer mixture, however, provides more CO in the exhaust gases.

In a practical embodiment of the motor vehicle according to the invention the electrical circuit of the throw-over valve of the one portion a switching means coupled to the throttle valve is substantially open in both extreme end portions of the throttle valve and is closed in the range lying therebetween, in such a way that in the first circumstance the chamber of the cylinder not bordering the movable half pulley is connected with the atmosphere (FIG. 1) and that in the second circumstance (FIG. 2) said chamber is connected with the intake manifold of the engine.

Figure 7:
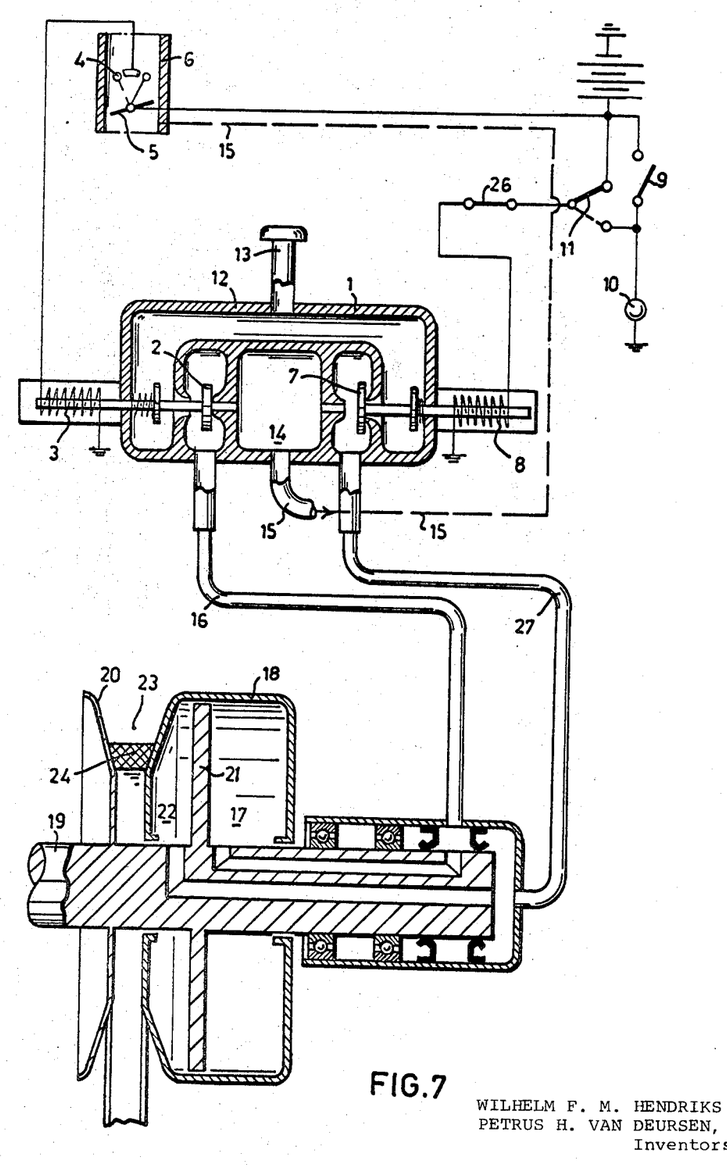
FIG. 7 depicts a compositely illustrated "no gas" and "full gas" setting of the inventive components of the form shown in FIGS. 5 and 6.

In another practical embodiment according to the invention a switching means is provided in the circuit of the second portion, said switching means operating on actuation of the braking means, and a switching means, which as a manually operated so-called mountain brake is adapted to close said circuit and to open the switching means first mentioned in such a way that when said circuit is interrupted the chamber of the cylinder bordering the movable half pulley is connected with the atmosphere, (FIG. 3) and said chamber being connected with the intake manifold of the engine when said circuit is closed as in the position of said valve 7 in FIG. 7.

The drawing FIGS. 1–8 show various setting and conditions in diagrammatic cross section of a portion of a motor vehicle, and related switching circuitry, according to the invention wherein:

The housing 1 contains the throw-over valve comprising two portions. One portion, at the left, comprises a valve 2 controlled by an electric magnetic coil 3 of the solenoid type responsive to actuation of a microswitch 4 arranged on the axis of the throttle valve 5 in the intake manifold 6 of the engine. The other portion, at the right, comprises a valve 7 controlled through another similar electro-magnetic coil 8 by a switch 9 connected with the mechanism for putting on the brakes of the vehicle. Said switch can be the switch of the brake signal light 10.

Figure 1:
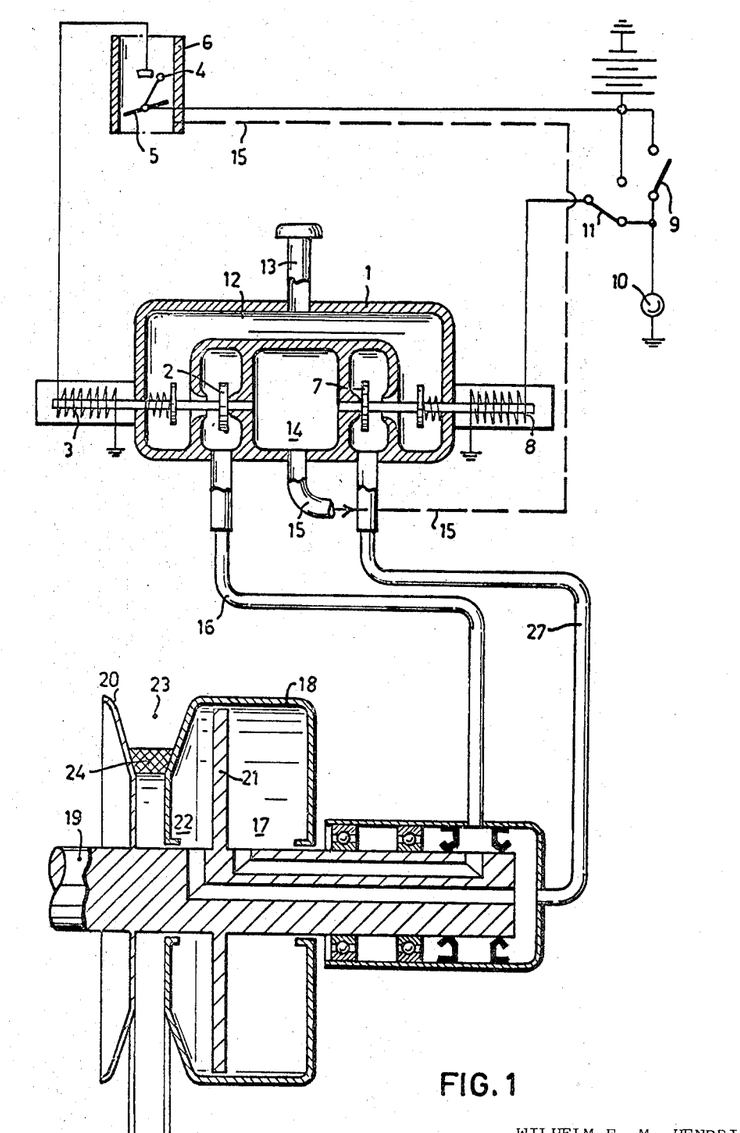
FIG. 1 schematically and partially in cross-section shows an idling speed condition of the one preferred form of the inventive device.

FIG. 1 shows the relative valve, pulley and switch positions when the vehicle engine runs at idling speed, with the V-belt running deep in the V-shaped pulleys, and when said valves 2 and 7 are in their normal, nonenergized positions.

Figure 2:
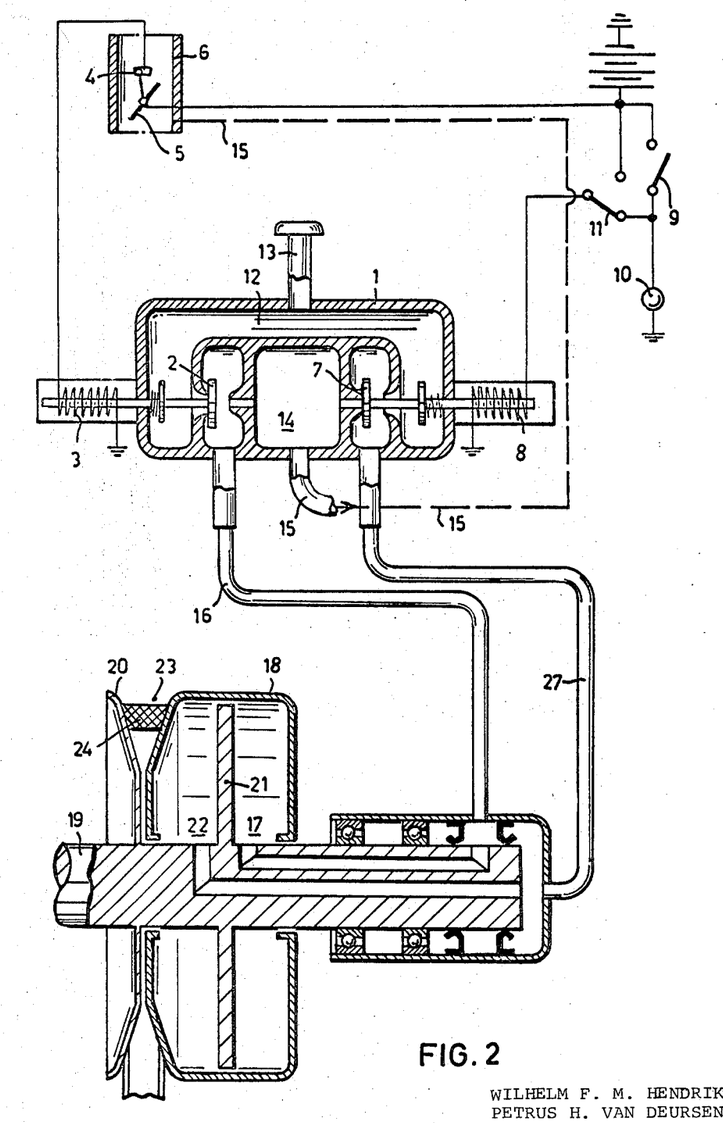
FIG. 2 shows a similar view with the inventive device in a slightly moved position responsive to an intermediate speed condition.

FIG. 2 shows an intermediate position of the throttle-valve tripping switch 4, in which the V-belt is moved to run at a larger diameter of the pulleys, dependently of the couple to be transmitted, by means of the valve 2, as opened by the energized solenoid 3, thereby connecting chamber 17 via line 16, chamber 14 and line 15 with the vacuum effected by connection to the intake manifold pipe 6.

Figure 3:
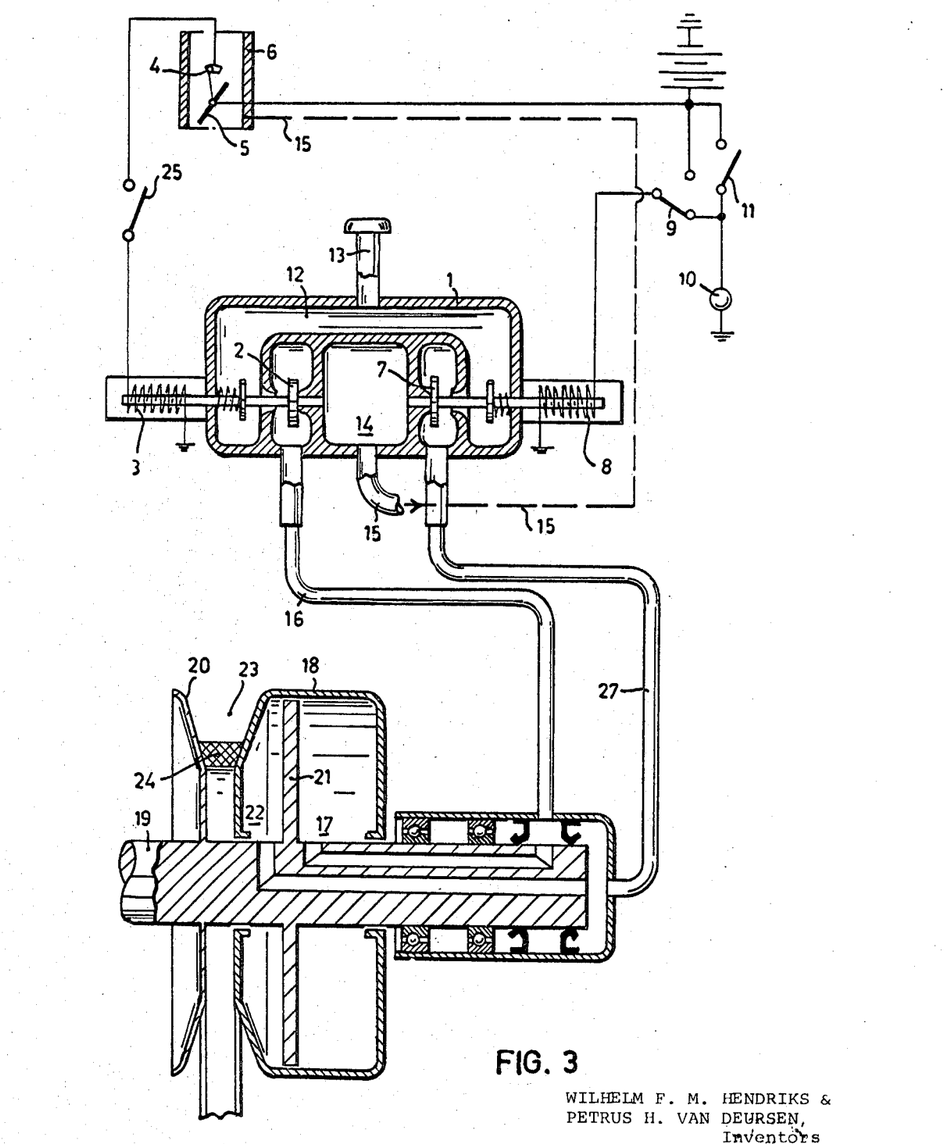
FIGS. 3 and 4 depict a slightly modified form of the invention also shown at intermediate range speed conditions with the components in slightly changed conditions.

FIG. 3 shows an intermediate position of the throttle-valve 5, in which the V-belt runs at a small diameter of the pulleys, whereby the switch 4 of said valve 5 is closed, but wherein a switch 25 operable responsive to road speed indicating means is in the open, interrupted condition due to the fact that a predetermined speed has not yet been reached.

Figure 4:
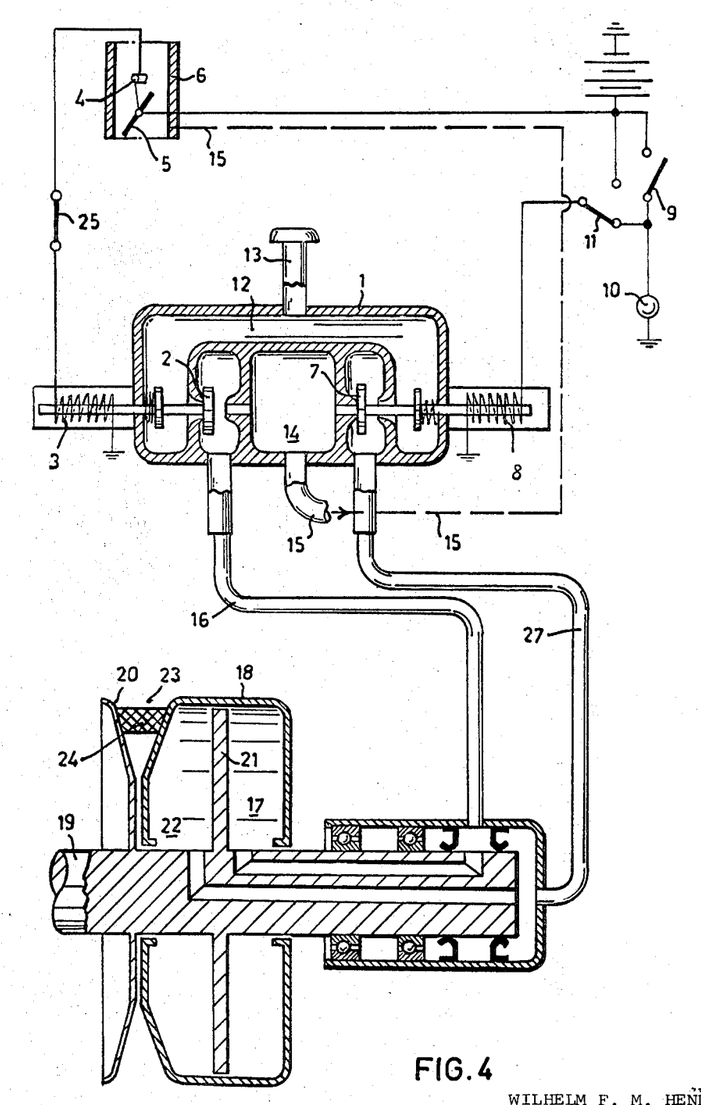

FIG. 4 again shows an intermediate position of the throttle valve 5, in which switch 25 is closed, because the predetermined road speed has been reached, and the V-belt is again running at a greater diameter of the pulleys.

Also the valve 7 can be activated through the electrical coil 8 by the selective manual operation of the so-called mountain brake switch 11, by which it is possible to retard the vehicle by means of the engine, that is, without applying the normal brakes which could be overheated in long descents. Both portions of said throw-over valve can be connected with the atmosphere through the chamber 12 and an open connection 13, or with the intake manifold 6 through the chamber 14 and the pipe 15 when the respective valves 2 and 7 are suitably shifted. On the other hand the portion with the valve 2 is in connection with the chamber 17 of the cylinder 18 through the pipe 16, said cylinder 18 being axially shiftable and divided into two chambers 17 and 22 by the fixed piston 21 connected to the shaft or axis 19 of the belt pulley 20. The portion of the throw-over valve 1 with the valve 7 is connected with the chamber 22 of cylinder 18 through the pipe 27, said chamber 22 bordering the groove 23 of the adjustable drive pulley 20 in which the V-belt 24 can be moved between small and large diameter positions which provides a large speed-reduction ratio.

The centrifugal switch 25 operates in dependence on the vehicle speed, and therefore can operate through the flexible shaft of the speedometer and can be closed above a predetermined speed.

A centrifugal switch 26 operating in dependence on the number of revolutions of the engine is preset to be opened below a certain number of revolutions of the engine.

Figure 5:
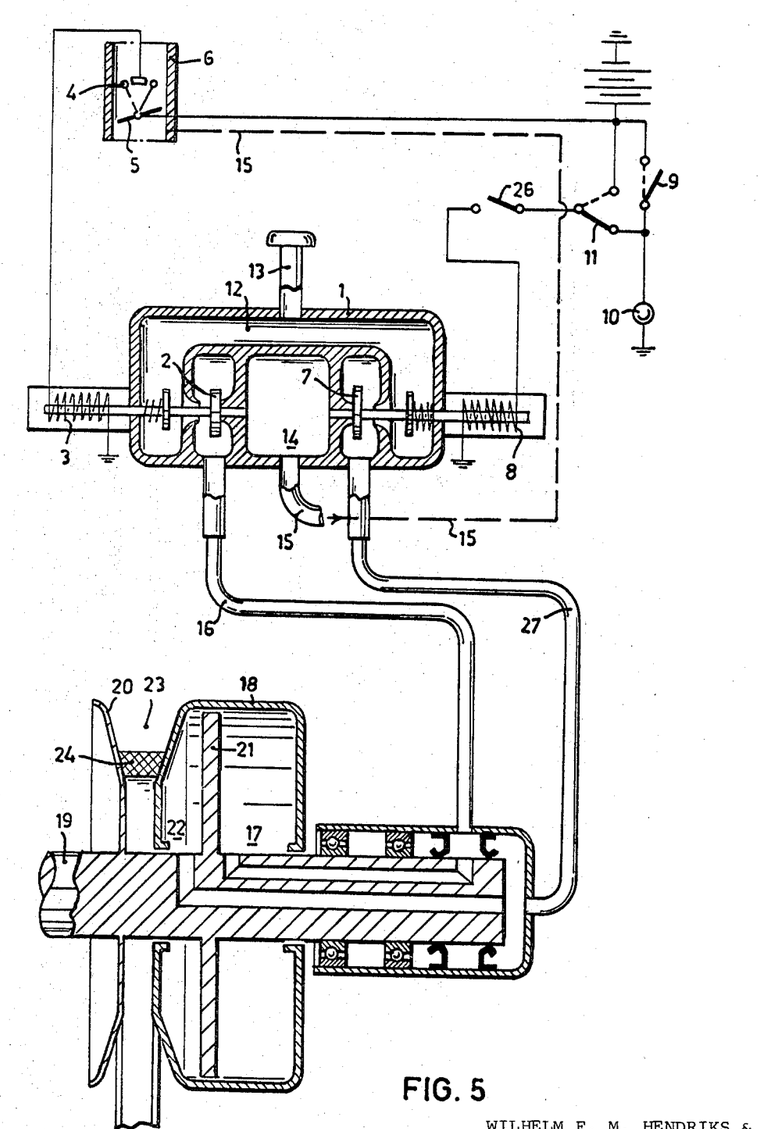
FIG. 5 depicts a still further slightly modified form of the invention with respect to a slightly different electrical schematic, with the throttle valve in a nearly closed condition.

FIG. 5 shows the position in which the throttle valve 5 is in its nearly closed position, whereby the centrifugal switch 25 is completely omitted, but the other centrifugal switch 26 is provided, said switch 26 shown open or being interrupted responsive to the engine running slowly. Both chambers 22, 17 are under atmospheric pressure, and if the switches 11 and 9 are operated, nothing happens. Said switch 26 is necessary in order to be able to satisfy certain anti-air pollution requirements, since at idling speed when the switch 11 is closed, the construction mixture must be rich in order to prevent stalling of the engine as may be caused by the suction of false air.

"Without gas," such as when idling, the switch 4 is open. Then the valve 2 is in the position shown in FIG. 1 or 3 and the chamber 17 is connected with the atmosphere through the pipe 16, the chamber 12 and the pipe 13. The same occurs during wide open throttle 5. The switch 4 (see dotted line) is closed between said two end positions. Then the chamber 17 is connected with the chamber 14 through the pipe 16 and with the intake manifold 6 through the pipe 15. Then the volume of the chambers 17 decreases and the belt is climbing up in the pulley responsive to cylinder 18 shifting axially to the left in the drawings. The low transmission ratio for high gear then comes into operation.

During fully opened throttle the chamber 17 is again connected with the atmosphere responsive to cylinder 18 moving in the right hand direction and the belt again drops in low gear with large transmission ratio. When applying the brakes the coil 8 attracts the valve 7 through the switch 9 and the chamber 22 is connected with the intake manifold 6 through the pipe 27, the chamber 14 and the pipe 15, so that the volume of the chamber 22 decreases upon cylinder 18 shifting axially in the right-hand direction, and the belt 24 drops into low gear with large transmission ratio and again is ready in its initial position to drive off.

FIG. 6 again shows the intermediate position of the throttle valve 5. The chamber 17 remains connected with the suction tube and the chamber 22 with the atmosphere. The switch 26 at first is interrupted, but then is closed. Nothing happens, however, since neither the switch 11 (mountain-brake switch), nor the switch 9 (normal brake) are closed.

Figure 6:
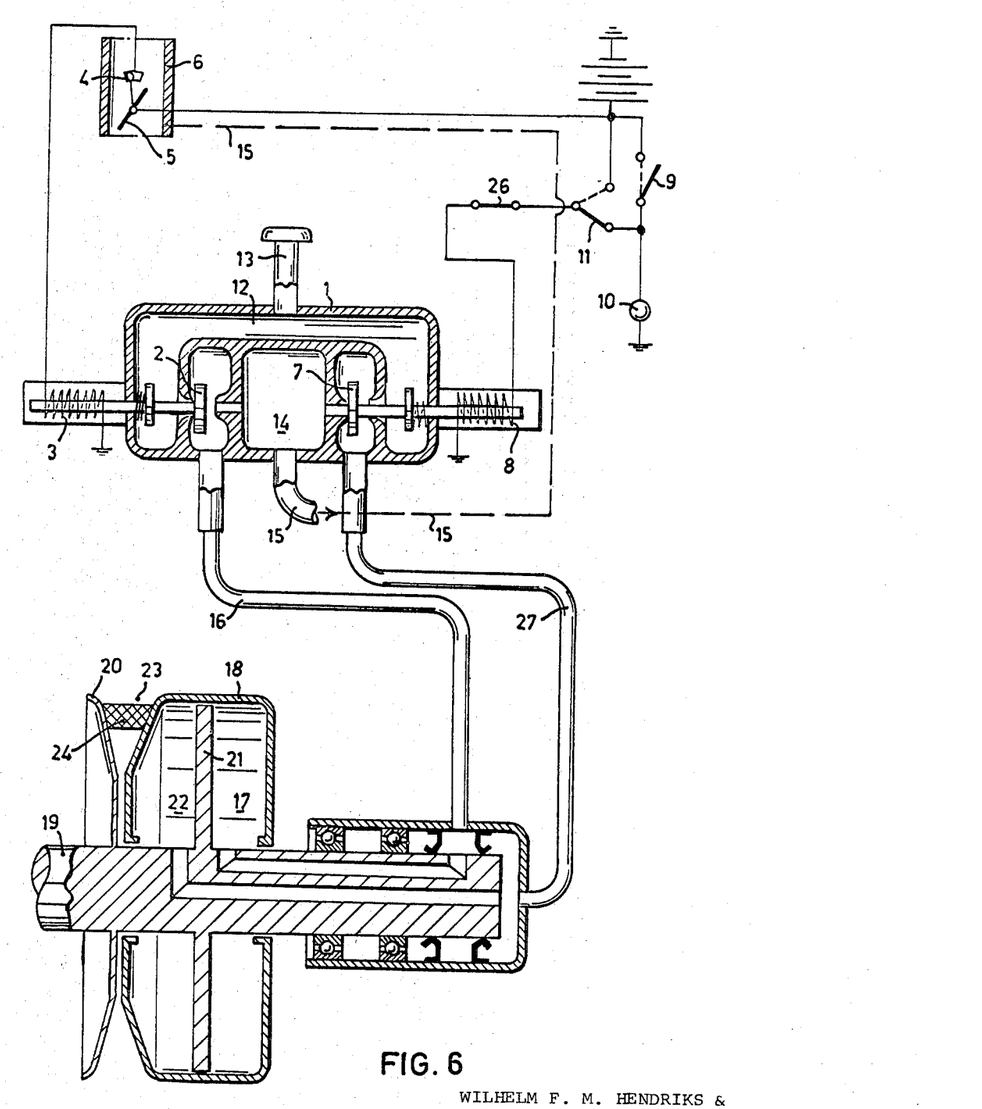
FIG. 6 depicts an intermediate speed condition of the modified inventive components of FIG. 5.

Therefore, when the switch 9 or the switch 11 are operated, chamber 22 is also connected to the suction tube 6. When closing the so-called mountain brake switch 11 the same as in the latter-mentioned paragraph occurs. The effect of the normal brake on the electrical circuit of the vacuum system is that said circuitry is cut out. The brakes only operate the switch 9 of the brake signal light. If it is forgotten to switch off the mountain brake switch-induced vacuum later, it will be impossible to over rev or over accelerate the engine a wide opened throttle, because both chambers 17 and 22 are connected with a vacuum.

FIG. 7 shows the "no gas" or "full gas" position of the throttle valve 5 when the switch 11 of the mountain-brake is closed. The chamber 17 is under atmospheric pressure. The chamber 22 is connected to the suction tube 6, because the switches 26 and 11 are closed.

In the "no gas" position, when the engine runs fast (driven engine), the switch 26 remains closed and the belt shows the tendency to run in the small diameter of the pulleys.

Figure 8:
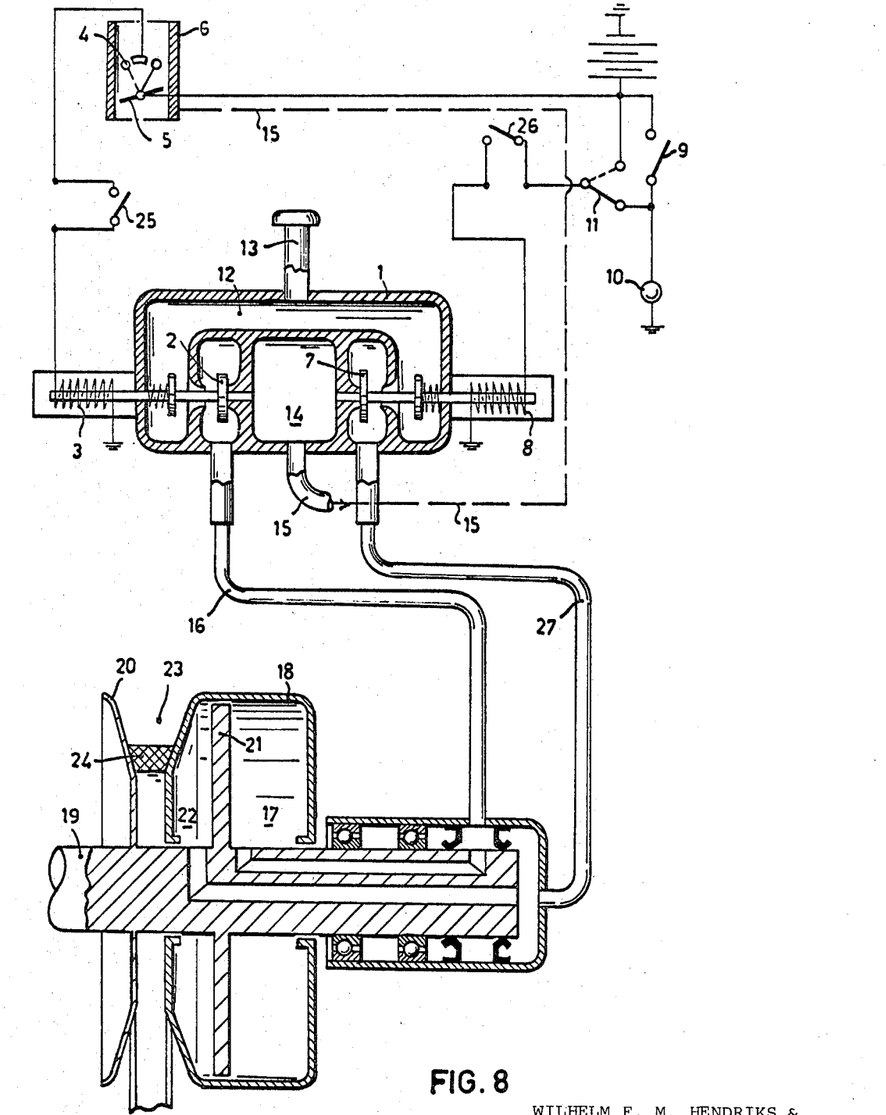
FIG. 8 is illustrative of still another embodiment which essentially combines the electrical schematic components of the various previous embodiments, and showing the throttle valve in an intermediate speed condition.

FIG. 8 illustrates the condition in which the throttle valve 5 is in the intermediate position, wherein the chamber 22 is connected with the atmosphere. The switch 25 at first is interrupted and the chamber 17 is not connected with the suction tube 6. If the speed of the vehicle reaches a predetermined value, the switch 25 is then closed.

Summarizing the foregoing, it follows that the valve 2 provides the connection of the chamber 22 (dependent on the switch 4 of the throttle valve 5 of the carburetor or dependent on the switch 25) with the atmosphere 13 or with the suction tube 6 through the tube 15.

The same applies to the valve 7, which provides (dependent on the brake switch 9 or the manually operated switch 11 or dependent on the engine r.p.m. switch 26) the connection of the chamber 17 with the suction tube 6 through the tube 15 or with the atmosphere 13.

The switch 25 provides the improvement of the "shift quality." Switch 26 provides the improvement with regard to pollution by the exhaust gases since then the fuel mixture at idling speed of the motor can be adjusted to a less rich, lean mixture.

We claim:

1. In a motor vehicle provided with an internal combustion engine having a carburetor and related intake-manifold-connected suction tube with a pivotal gas throttle control valve therein having extreme open and closed end positions and said vehicle further embodying vehicle braking means including electrical circuitry and foot-brake-actuated switch means; an improved transmission system comprising at least one driving and one driven complemental pulley and V-belt drive means operatively connected with means to drive said vehicle, wherein the improvement for said transmission system comprises, in combination:

(a) a power transmitting drive shaft (19) operatively connected with said engine;
  (b) an axially expandable, variable diameter V-belt driving pulley (20) separate from the aforesaid driven pulley and V-belt drive, and fixed for rotation on the shaft (19) of paragraph (a), said expandable driving pulley comprising a pulley-half portion fixed to said shaft and a pulley half portion with means for axially moving it relative to said shaft; said expandable driving pulley operatively connected via said drive belt (24) with the aforesaid means to drive said motor-vehicle;
  (c) means defining an annular cylinder (18) in cooperation with said movable pulley half portion of paragraph (b) and with said shaft (19) of paragraph (a), and operatively secured to said movable pulley half and enclosing a cylinder-dividing partition (21) fixed to an extending radially from said shaft (19) for dividing said cylinder (18) into a first chamber (22) which is directly adjacent the movable pulley-half portion which cooperates with the V-belt (24), and a second chamber (17) being remote therefrom;
  (d) means including multiple throw-over valve (1) and conduit means having separate portions connected with said cylinder chambers and for operatively adjusting said adjustable driving pulley (20); and
  (e) electrical means including further circuitry connected with and for controlling the separate portions of said throw-over valve means, and also connected separately with and for selective operation by said throttle control valve and said vehicle braking means, respectively, responsive to and in dependence upon varying driving circumstances and conditions of said motor vehicle.

2. The improvement as defined in claim 1, wherein the separate portions of said throw-over valve means includes first and second 3-way valves, respectively, each valve including means operatively connecting it and said cylinder of paragraph (c) with the external atmosphere in one setting, and in another setting with said suction tube for controlling and generating pressure differentials within said respective first and second chambers of said cylinder to variably adjust said expandable pulley; and said electrical means and circuitry of paragraph (e) are connected with and control said three-way valves.

3. The improvement as defined in claim 2 whereby said second 3-way valve as operable connected with and operable responsive to said switch actuation by the vehicle braking means includes means so that when
  (1) placed in one of its positions as by said braking means, said second chamber is put in communication with said exterior atmosphere, and
  (2) when placed in another position, it closes the connection between said second chamber and the atmosphere and opens communication between said second chamber and said suction tube.

4. The improvement as defined in claim 2 wherein said first and second 3-way valves are arranged in a common housing; said housing having a common tube connection to be used by either of said valves for connection with said suction tube; and also having a common vent to the atmosphere for selective use by either of said 3-way valves and their related conduit means.

5. The improvement as defined in claim 2 whereby said first 3-way valve as operably connected with said throttle control valve is operable responsive to an opening actuation thereof and includes means so that said second chamber is thereby placed in communication with said suction tube, and when said throttle valve moves to its closed position causes said second chamber to be placed in communication with the atmosphere, while closing the communication with said suction tube.

6. The improvement as defined in claim 5 wherein the means of paragraphs (d) and (e) further include corresponding first and second electro-magnetic solenoid valve actuating means connected to selectively actuate each of said 3-way valves; and said latter-mentioned circuitry including a first switch (4) connected therewith to energize said first solenoid means operating said first 3-way valve, and said first switch (4) having an actuating arm mounted for pivotal movement on and with said pivotal throttle control valve to thereby enable said first switch (4) to be closed when said throttle valve is positioned within a range intermediate its said extreme end positions, with said second chamber thereby being connected via said 3-way valve with said suction tube; and when said first switch (4) is in an open condition, said second chamber is alternately connected with the atmosphere via and while said 3-way valve closes the communication with said suction tube.

7. The improvement as defined in claim 6, wherein the circuitry connecting said first switch (4) with said first solenoid means is further provided with a second switch (25) of the centrifugal type operatively connected with and adapted to operate under the influence of means responsive to the vehicle speed, so that below a predetermined speed the said circuit is interrupted to effect a speed change by varying the ratio of power transmission via said variable diameter driving pulley.

8. The improvement as defined in claim 5 wherein the means of paragraphs (d) and (e) further include corresponding first and second electro-magnetic solenoid valve actuating means connected to selectively actuate each of said 3-way valves; and said latter-mentioned circuitry including in the braking circuitry a different first switch (9) connected therewith and operatively with the foot brake circuitry to energize the solenoid means operating said second 3-way valve responsive to said foot-brake actuation; and a second switch (11) adapted preferably for selective hand-manual actuation with related circuitry to facilitate closing the circuitry to energize said second solenoid means independently of said first switch (9) and its related circuitry, so that said first chamber of the pulley-mounted cylinder is connected with said suction tube when the circuitry is interrupted by said first switch (9) being open, but said first chamber being connected with said atmosphere via said second 3-way valve when either of said first (9) and second (11) switches is closed, with said second 3-way valve thereby simultaneously closing communication of said first chamber with said suction tube.

9. The improvement as defined in claim 8, wherein the circuitry served selectively by the said different first switch (9) and said second switch (11), is further provided with a third switch (26) of the centrifugal type operatively connected with and adapted to operate under the influence of means responsive to variations in the r.p.m. of said engine, so that below a predetermined number of r.p.m. of said engine said circiut is interrupted to prevent an undesired speed change by preventing said second chamber (17) from being connected with said suction tube.

10. In a motor vehicle provided with an internal combustion engine having the usual carburetor and related intake-manifold-connected suction tube with a pivotal gas throttle control valve therein having extreme closed and open end positions, said vehicle further embodying vehicle braking means including electrical circuitry with footbrake actuated switch means; an improved transmission system comprising at least one driving and one driven complemental pulley and V-belt drive means operatively connected with means to drive said vehicle, wherein an improvement for the transmission system comprises, in combination:

(a) a power transmitting drive shaft (19) operatively connected with said engine;

(b) an axially expandable, variable diameter V-belt driving pulley (20) separate from the aforesaid driven pulley and V-belt drive, and fixed for rotation on the shaft (19) of paragraph (a), said expandable driving pulley comprising a pulley-half portion fixed to said shaft and a pulley-half portion with means for axially moving it relative to said shaft; said expandable driving pulley (20) operatively connected via said drive belt (24) with the aforesaid means to drive said motor-vehicle;

(c) means defining an annular cylinder (18) in co-operation with said movable pulley half portion of paragraph (b) with said shaft (19) of paragraph (a), and operatively secured to said movable pulley half and enclosing a cylinder-dividing partition (21) fixed to and extending radially from said shaft (19) for dividing said cylinder (18) into a first chamber (22) which is directly adjacent the movable pulley-half portion which cooperates with the V-belt, and a second chamber (17) being remote therefrom;

(d) throw-over valve and conduit means, including first and second 3-way operating valves, each of which includes conduit and other means for operatively selectively connecting said first (22) and second (17) chambers of the cylinder (18) of paragraph (c) with the atmosphere in one setting and in another setting with said suction tube for controlling and generating pressure differentials within said respective chambers to variably adjust the expandable pulley;

(e) electrical means further including electro-magnetic solenoid valve-actuating means and related circuitry connected to and for selectively actuating each of said 3-way valves separately by the throttle control valve and by the vehicle braking means, respectively, responsive to and in dependence upon varying driving circumstances and conditions of said motor vehicle;

(f) said first 3-way valve and its related circuitry comprising switch means including:

(1) a first switch (4) connected with and operable by said pivotal throttle control valve so that said switch (4) is open when said control valve is in either of its said extreme end positions, with the circuitry to said first 3-way valve and its actuating solenoid interrupted and said first 3-way valve disposed so that said second chamber (17) is connected with external atmosphere and said pulley is one given state of expandability; and said switch (4) is closed by said throttle control valve when positioned within a range intermediate its extreme end positions, whereby said second chamber (17) is connected to said suction tube, while simultaneously closing off said communication to the atmosphere; and (2) a second switch (25) of the centrifugal type operatively connected with and adapted to operate under the influence of means responsive to vehicle speed, so that after said vehicle is moving and above a predetermined speed condition, the circuit is closed to effect a ratio change of the power transmission via said variable driving pulley changing responsive to changed differential pressure conditions within its chambers;

(g) said second 3-way valve and its related circuitry comprises:

(1) a different first switch (9) operative to be closed responsive to foot brake actuation to energize said second solenoid means operating the second 3-way valve, and (2) a second switch (11) adapted preferably for selective hand-manual actuation with related circuitry to facilitate closing the circuitry to energize said second solenoid means independently of said first switch (9) and its related circuitry, so that said first chamber (22) of the pulley-mounted cylinder (18) is connected with said suction tube when the circuitry is interrupted by said first switch (9) being open, but said first chamber (22) being connected with said atmosphere via said second 3-way valve when either of said first (9) and second (11) switches is closed, with said second 3-way valve thereby simultaneously closing communication of said first chamber with said suction tube;

(3) a third switch (26) of the centrifugal type operatively connected with and adapted to operate under the influence of means responsive to variations in the r.p.m. of said engine, so that below a predetermined number of r.p.m. said circuit is interrupted to prevent an undesired speed change by preventing said second chamber (17) of said driving pulley from being connected with said suction tube; and (h) wherein said first and second 3-way valves are arranged in a common housing; said housing having a common tube connection to be used by either of said valves for connection with said suction tube, and also having a common vent to the atmosphere for selective use by either of said 3-way valves and their related conduit means.

References Cited

UNITED STATES PATENTS

| | | | |
|---|---|---|---|
| 2,829,533 | 4/1958 | Ballmer | 74—846X |
| 2,903,083 | 9/1959 | Kelley | 74—856X |
| 2,997,144 | 8/1961 | Gsching | 192—4(B) |
| 3,017,785 | 1/1962 | Brugghen | 74—846 |
| 3,115,049 | 12/1963 | Moan | 74—868 |
| 3,433,101 | 3/1969 | Scholl | 74—866 |
| 3,435,713 | 4/1969 | Pfisterer | 74—866 |

JAMES A. WONG, Primary Examiner

U.S. Cl. X.R.

74—230.17; 192—4